United States Patent [19]

Belanger et al.

[11] Patent Number: 5,709,002
[45] Date of Patent: Jan. 20, 1998

[54] SPHERICAL BEARING ARRANGEMENT FOR VEHICLE LAUNDRY SIDE BRUSH

[75] Inventors: Michael J. Belanger, Novi; Robert J. Wentworth, Farmington Hills, both of Mich.

[73] Assignee: Belanger, Inc., Northville, Mich.

[21] Appl. No.: 641,116

[22] Filed: Apr. 29, 1996

[51] Int. Cl.$^6$ ........................... B60S 3/06
[52] U.S. Cl. ................. 15/97.3; 15/53.2; 15/53.3; 15/DIG. 2
[58] Field of Search ............... 15/53.1–53.4, 15/97.3, DIG. 2

[56] References Cited

U.S. PATENT DOCUMENTS

| | | |
|---|---|---|
| 2,381,054 | 8/1945 | Holmes . |
| 2,579,866 | 12/1951 | Rosseau . |
| 2,646,586 | 7/1953 | Foutes . |
| 3,035,293 | 5/1962 | Larson . |
| 3,090,981 | 5/1963 | Vani et al. . |
| 3,233,264 | 2/1966 | Nickl . |
| 3,350,733 | 11/1967 | Hanna . |
| 3,793,667 | 2/1974 | Capra . |
| 3,840,931 | 10/1974 | Bivens . |
| 3,868,740 | 3/1975 | Brovig ................... 15/DIG. 2 X |
| 3,881,208 | 5/1975 | Miner ................... 15/DIG. 2 X |
| 3,943,590 | 3/1976 | Hanna ................... 15/53.3 |
| 4,424,602 | 1/1984 | Belanger et al. ........... 15/97.3 |
| 4,439,883 | 4/1984 | Hanna ................... 15/97.3 |
| 4,470,167 | 9/1984 | Bivens . |
| 4,513,467 | 4/1985 | Roncaglione ............ 15/DIG. 2 X |
| 4,541,874 | 9/1985 | Smith . |
| 4,962,560 | 10/1990 | Moore ................... 15/53.3 |
| 5,361,443 | 11/1994 | Belanger et al. ......... 15/DIG. 2 X |

FOREIGN PATENT DOCUMENTS

| | | | |
|---|---|---|---|
| 46132 | 2/1981 | European Pat. Off. ....... | 15/DIG. 2 |
| 2028157 | 12/1971 | Germany ................... | 15/DIG. 2 |

Primary Examiner—Mark Spisich
Attorney, Agent, or Firm—Young & Basile, P.C.

[57] ABSTRACT

A spherical bearing for a vehicle laundry side brush which affords universal angular displacement freedom for the side brush. The spherical bearing consists of a hemispherical bearing member to which the brush and brush drive components are mounted as a unit. The bearing member sits in a seat in the outboard end of a brush extension arm. Cage members on the seat operate with extensions associated with the bearing to prevent rotation of the bearing about the brush axis. The moment of inertia of the brush components located below the pivot point is substantially greater than the moment of inertia of components mounted above the pivot point thereby providing a self-damping function.

6 Claims, 2 Drawing Sheets

SPHERICAL BEARING ARRANGEMENT FOR VEHICLE LAUNDRY SIDE BRUSH

INTRODUCTION AND FIELD OF THE INVENTION

This invention is in the field of vehicle laundry implements, particularly vehicle laundry side brushes, and relates more specifically to a novel support apparatus which provides increased safety and reduced maintenance by permitting a vehicle side brush an essentially unlimited degree of angular freedom of movement in response to an applied force.

BACKGROUND OF THE INVENTION

A vehicle laundry; i.e., a washing and/or polishing facility for motor vehicles, typically is equipped with one or more side brushes having motor driven center shafts which rotate about an essentially vertical, albeit sometimes inclined or tilted, axis and arranged to contact at least the side surfaces of a vehicle being treated.

It is known to mount the side brush assembly on one or more pivot arms which permit the brush to swing inwardly and outwardly to accommodate vehicles of varying width as well as to withdraw from any contact with the vehicle on demand.

It is also known to mount vehicle side brushes in gimbal-like structures which afford two degrees of freedom for angular movement of the brush.

Finally, it is known to anticipate structural damage to side brushes and particularly to the brush shafts due to inadvertent contact between a vehicle and the brush by providing a deliberately weakened link in the brush shaft which link is easily replaced. This link acts as a sacrificial brush component which prevents damage to other more expensive and less easily replaced brush components. See Applicant's prior pending application Ser. No. 08/352,657 filed Dec. 9, 1994 U.S. Pat. No. 5,511,272.

SUMMARY OF THE INVENTION

The present invention is an improvement to side brush support systems in providing an extraordinarily simple, self-damping support for a vehicle laundry implement such as a side brush compatible with swing in/swing out mounting arrangements and affording an essentially unlimited degree of freedom of angular movement of a depending brush or implement shaft in response to an applied force.

This is achieved through the use of an essentially spherical bearing member and bearing seat, the bearing member being mechanically attached as hereinafter described to the implement drive motor and the drive shaft such that the drive shaft passes through the universal pivot point of the bearing relative to the seat and extends or depends essentially vertically therefrom. The seat member may be and typically is attached to a support component such as a beam or arm which itself may pivot to permit the implement to move in and out of engagement with the vehicle being treated.

In the preferred form, the spherical bearing is hemispherical in shape and has mechanically connected thereto an upper plate member having one or more lateral extensions which are disposed within respective caging structures which are mechanically associated with the bearing seat. The caging structures in the preferred embodiment prohibit rotation of the spherical bearing in the brush seat about the longitudinal brush axis due to the reaction torque of the drive motor but, at the same time, provide essentially no inhibiting influence on the universal pivoting motion of the hemisphere in the seat. The cages may also limit vertical travel of the brush and the spherical bearing due to a force which may tend to lift the brush; i.e., cause essentially rectilinear translation thereof along or essentially along the brush axis.

In the typical and preferred form, the brush, drive motor, spherical bearing and seat are arranged so as to provide a self-damping action wherein the motor is mounted above the universal pivot point of the spherical bearing and the brush is disposed below the universal pivot point, the brush axis serving as the mechanical connection between the two and, of course, passing in all operating orientations through the universal pivot point. The mass of the motor is less than the mass of the brush and, moreover, is located a shorter distance above the universal pivot point than the brush center of gravity is below the universal pivot point. Accordingly, the moment of inertia of the brush below the pivot point is substantially greater than the moment of inertia of the motor and associated components above the universal pivot point. This movement unbalance, combined with the friction in the bearing itself, makes the support arrangement essentially self-damping and, in the ordinary implementation, provides safety and a reduced probability of brush damage without the need for gimbals and damping mechanisms such as pneumatic and hydraulic cylinders.

DETAILED DESCRIPTION OF THE PREFERRED EMBODIMENT

Figure 1:
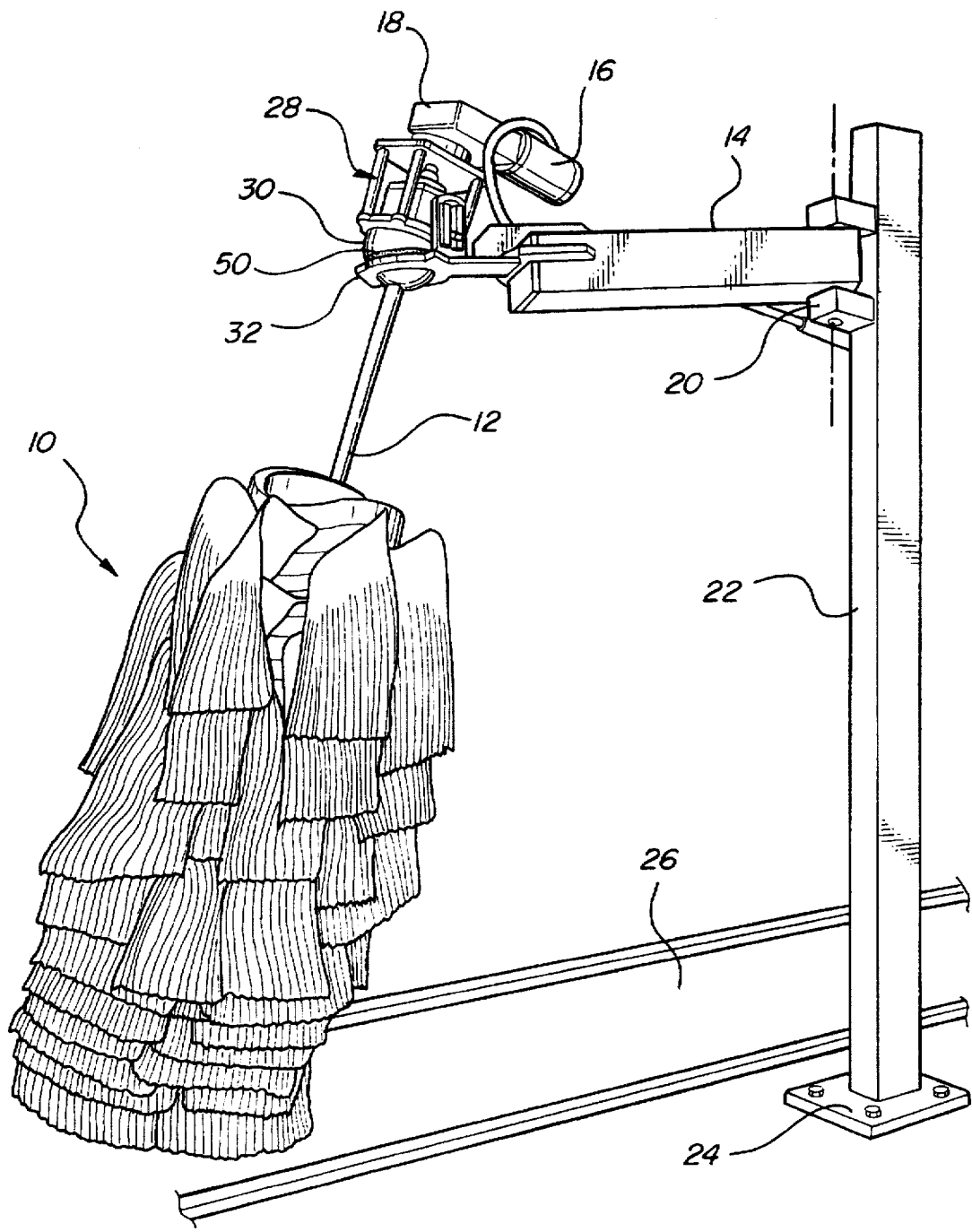
FIG. 1 is a perspective view of a side brush incorporating the inventive support.

Referring to the Figures and particularly to FIG. 1, there is shown a vehicle side brush 10 of the radially extending cloth element type having an essentially vertically oriented drive shaft 12 mounted on the outboard end of an aluminum beam 14 which acts as a swing arm to move the brush in and out of a vehicle contacting position adjacent lane 26. Shaft 12 is driven rotationally to activate the brush elements by a motor 16 having an associated gear box 18.

The brush 10 may be constructed in the manner described in applicants' copending application, Ser. No. 08/641,024, filed Apr. 29, 1996, the entire disclosure of such application being incorporated herein by reference.

Swing arm 14 is pivotally connected at 20 to a vertical support arm 22 having a base 24 which is suitably bolted in place adjacent the laundry lane 26. The arrangement shown in FIG. 1 contemplates a stationary vehicle laundering apparatus and means such as a conventional conveyor to cause slow movement of the vehicles to be treated along the wash lane 26 where they contact one or more washing implements such as side brushes, overhead brushes, and blower nozzles as will be apparent to those familiar with the vehicle laundry technology. It is to be understood, however, that the invention hereinafter described is also usable in connection with moveable gantry type systems wherein the washing apparatus moves relative to a stationary vehicle and further that the invention is susceptible of use in connection with other types of vehicle laundry apparatus such as polishing brushes.

Brush 10 and the associated drive components including shaft 12, motor 16 and gear box 18 are supported by apparatus 28 for universal pivotal or swiveling movement so as to permit the brush to adjust in position relative to a vehicle and/or to be readily moved out of harm's way upon occurrence of even relatively small side loads applied in any direction. This apparatus comprises a spherical bearing member 30 and a seat 32 attached to the swing arm 14 for receiving the spherical bearing member 30 as hereinafter described in greater detail with reference to FIGS. 2 and 3.

Figure 2:
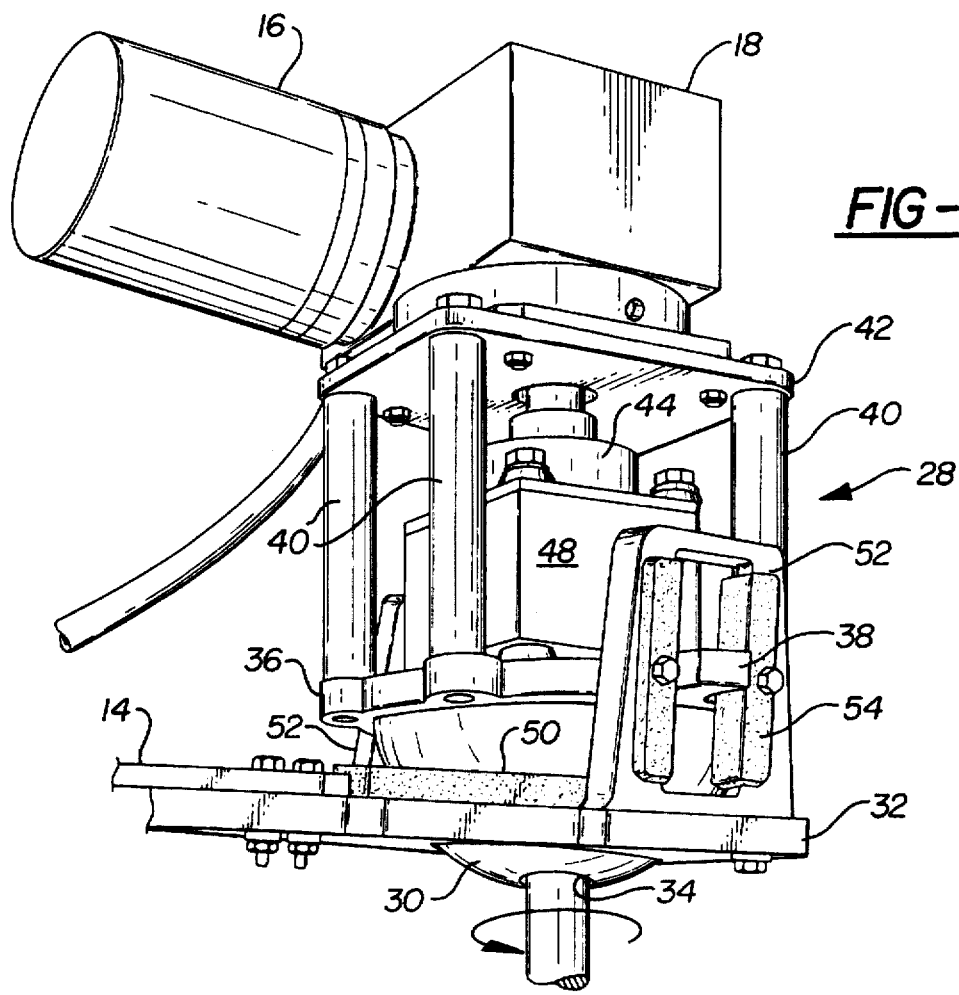
FIG. 2 is a perspective view of the spherical bearing of FIG. 1 and the motor support thereover.

Referring now to FIG. 2 the apparatus 28 is shown in greater detail to comprise an 8 inch diameter spherical bearing 30 of suitable hard plastic or phenolic material. The term "spherical" is to be construed to include full spheres as well as portions of a sphere; in this case the body 30 takes the shape of the lower half portion of a sphere and is formed with a vertical throughbore 34 which passes through the geometric center of the sphere; i.e., the common radius which lies in the center of the flat equatorial upper plane of the body 30. The throughbore 34 accommodates the brush drive shaft 12 in spaced; i.e., non-binding, relationship as hereinafter described.

Secured by means such as screws to the top plane of the spherical bearing 30 is a base plate 36 which is preferably formed of aluminum stock and which has a pair of diametrically opposite extensions or ears 38. Aluminum pillars 40 are bolted to the plate 36 in a quadrangular arrangement to support an upper plate 42 which lies in spaced parallel relationship to the lower plate 36. Mechanically secured to the upper plate 42 are the motor 16, gear box 18, and a spacer 44. In the arrangement shown in FIG. 2, the motor 16, which may be either electric or hydraulic, has an essentially horizontal output shaft (not shown) which extends into the gearbox 18. The gearbox 18 performs the functions of speed reduction and turning the drive direction through an angle of 90° so that it can be coupled to the shaft 12. The speed reducer/gear box 18 has an output shaft which extends downwardly through the spacer 44 and a coupling 46 to a bearing box 48 to the brush drive shaft 12 which extends downwardly through the bore 34 in the spherical bearing 30.

The bearing 30 sits in a ring-like plastic seat 50 having a spherically milled bearing surface and which in turn is bolted to the top surface of the support plate 32 which is carried on the outboard end of the swing arm 14. Since the internal surface of the seat 50 conforms to the external surface configuration of the spherical bearing 30, the entire unit consisting of spherical bearing 30, the plates 36 and 42, the motor 16, the gear box 18, and the brush shaft 12 is susceptible of essentially universal angular movement about the pivot center; i.e., the geometric center of the bearing 30, upon application of the applied force to the unit. An applied force typically arises out of contact between the brush 10 and the surface of a vehicle.

Because the spherical bearing 30 sits in the spherical surface of the ring-like seat 50 and is moveable therein with relatively little frictional resistance, it is apparent to those skilled in the mechanical arts that operation of motor 16 and the resulting rotation of brush shaft 12 and brush 10 produces a reaction torque which would tend to rotate the bearing 30 in the seat 50 in a direction opposite to that of the applied rotation of shaft 12. To prevent such rotation, a pair of machined aluminum cage members 52 are bolted at diametrically opposite positions on the base plate 32 and have rectangular vertically oriented openings therein which receive and cage the lateral projecting ears 38 of the plate 36 secured to the top of the spherical bearing 30. Nylon bumpers 54 and 56 are secured to the opposite vertical inner surfaces of the cage members 52 for wear control purposes. The cages 52 effectively trap the ears 38 and prevent rotation of the plate 36 with or in opposite direction reaction to the rotation of the shaft 12 but do not restrict the universal pivotal motion of the bearing 30 in the seat 50 in any direction to any degree. In addition, the closed tops of the cage members 52 restrict vertical motion of the brush unit relative to the seat 50 and support plate 32 such as might occur by application of a force extending essentially along the brush shaft tending to lift the brush shaft and bearing 30 off of the seat.

Figure 3:
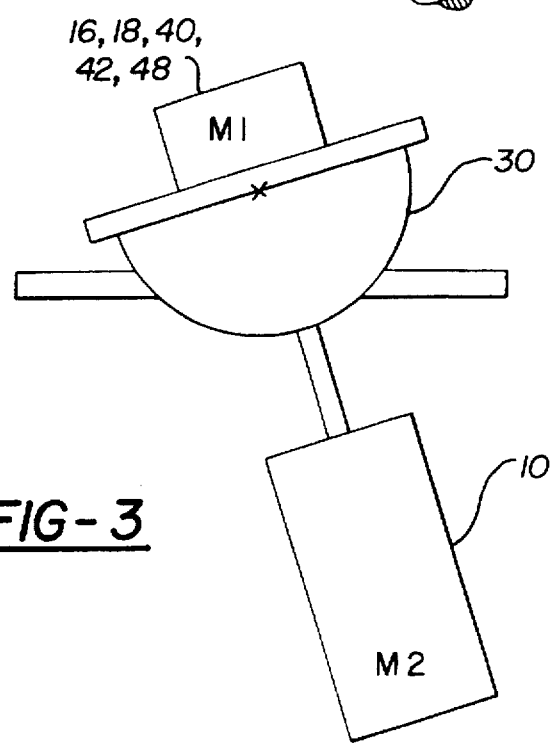
FIG. 3 is a schematic diagram of the relative moments of inertia of the structure of FIG. 1.

Reference to FIG. 3 provides insight into the preferred relationships between the physical parameters of the system of FIG. 1. FIG. 3 is a schematic diagram of the apparatus of FIGS. 1 and 2 and illustrates the fact that the mass M1 of the motor 16 and gear box 18 and associated components is located above the universal pivot center, while the mass M2 of the brush 10 and the shaft 12 is below the universal pivot center. Moreover, the arm of the moment M2 is much greater than the arm of M1. In a typical commercial apparatus, M1 is on the order of 100–150 lbs. whereas M2 is on the order of 400 lbs. for a dry brush and 450–500 lbs. for a brush when wet. The arm of M1 is typically between 4" and 12" whereas the arm for M2 is between 2'–4'. Accordingly, the moment of inertia of the mass below the pivot center is substantially greater and typically between about 4 and 10 times the moment of inertia of the upper mass M1 relative to the pivot center. This provides a substantial degree of self-damping and typically eliminates the need for additional damping mechanisms such as pneumatic and/or hydraulic cylinders.

We claim:

1. An omnidirectionally pivotal vehicle laundry implement comprising:

a drive shaft, a motor connected to rotate said shaft about its longitudinal axis and a vehicle contacting implement carried on the free end of said shaft;

a bearing member having a hemispherical bearing surface;

an annular seat for the bearing member;

means for mounting said shaft and implement to and in depending relation to the bearing member with the shaft extending through the seat, said shaft being unrestrained and unenclosed below said seat; and means mounted at least in part to said seat for preventing relative rotation between the bearing member and the seat about the shaft axis while still allowing substantially unrestrained omnidirectional pivotal motion of said shaft and said implement.

2. Apparatus as defined in claim 1 wherein said means for preventing rotation comprises at least one lateral extension member mounted to said bearing member and extending radially and laterally outwardly therefrom, and a cage member mounted to said seat and surrounding said extension member to prevent rotation thereof relative to said seat around the shaft axis but shaped to permit vertical motion of said extension member within said cage member as required to facilitate said omnidirectional pivotal motion.

3. Apparatus as defined in claim 1 wherein said motor is mounted above the pivot center defined by and between said hemispherical bearing member and said seat, the moment of inertia of said implement below the pivot center being substantially greater than the moment of inertia of the motor above the pivot center.

4. A vehicle laundry brush assembly comprising:

a drive shaft;

a brush operated by rotating the shaft;

a motor for rotating the shaft;

a bearing member having a hemispherical bearing surface;

a bearing seat for receiving said hemispherical member and suspending the shaft, motor and brush with the shaft in the generally vertical orientation; and means for restraining relative rotation between the bearing member and the seat about a vertical axis while permitting the shaft and brush essentially omnidirectional angular freedom of movement about a universal pivot center common to the bearing member and the seat.

5. Apparatus as defined in claim 4 wherein said restraining means comprises at least one lateral extension portion connected to said bearing member and projecting laterally and radially therefrom, and cage means associated with said seat for laterally and vertically surrounding said lateral extension portion for limiting rotation thereof around the shaft axis but permitting vertical movement as required to accommodate said universal pivotal motion.

6. Apparatus as defined in claim 4 wherein said restraining means comprises a pair of diametrically opposite extension members connected to said bearing member and radially oppositely and laterally therefrom, and cage means associated with said bearing seat for caging said extension members and restraining relative rotation between the bearing member and bearing seat while permitting said omnidirectional pivotal motion of said brush shaft and brush.

* * * * *